US008196330B2

(12) United States Patent
Smith

(10) Patent No.: US 8,196,330 B2
(45) Date of Patent: Jun. 12, 2012

(54) FIREARM BARREL CLEANING PATCHES

(76) Inventor: Shane Patrick Smith, Los Angeles, CA (US)

(*) Notice: Subject to any disclaimer, the term of this patent is extended or adjusted under 35 U.S.C. 154(b) by 0 days.

(21) Appl. No.: 13/059,228

(22) PCT Filed: Aug. 14, 2009

(86) PCT No.: PCT/US2009/004677

§ 371 (c)(1), (2), (4) Date: Feb. 15, 2011

(87) PCT Pub. No.: WO2010/019267

PCT Pub. Date: Feb. 18, 2010

(65) Prior Publication Data

US 2011/0146129 A1 Jun. 23, 2011

Related U.S. Application Data

(60) Provisional application No. 61/189,179, filed on Aug. 15, 2008.

(51) Int. Cl.
*F41A 29/02* (2006.01)
*B08B 1/00* (2006.01)
*B23P 11/00* (2006.01)

(52) U.S. Cl. .......................................................... 42/95

(58) Field of Classification Search ...... 42/95; 102/442, 102/529; 15/104, 165, 104.165; D32/40
See application file for complete search history.

(56) References Cited

U.S. PATENT DOCUMENTS

| | | | | |
|---|---|---|---|---|
| 209,276 | A | 10/1878 | Longden | |
| 330,619 | A | 11/1885 | Reed | |
| 363,951 | A | 5/1887 | Forster | |
| 373,747 | A | 11/1887 | Mansfield | |
| 460,986 | A | 10/1891 | Odell et al. | |
| 478,190 | A | 6/1892 | Hamilton et al. | |
| 621,857 | A | 8/1899 | Scott | |
| 1,291,131 | A * | 1/1919 | Radel | 15/147.2 |
| 1,427,582 | A | 8/1922 | Cumpston | |
| 1,591,425 | A | 6/1926 | Kingman | |
| 1,610,649 | A | 12/1926 | Bair | |
| 1,745,575 | A * | 2/1930 | Hooker | 15/104.165 |
| 2,236,123 | A | 12/1938 | Pierce | |
| 2,537,149 | A | 1/1951 | McKean | |
| 2,782,419 | A | 5/1954 | Swartz | |
| 2,765,740 | A | 10/1956 | Norman | |
| 2,862,218 | A * | 12/1958 | Krone | 15/104.16 |
| 2,980,941 | A | 12/1958 | Miller | |
| 2,877,482 | A | 3/1959 | Roy | |
| 3,064,294 | A | 7/1960 | Stocking | |
| 3,100,904 | A | 8/1963 | Stocking | |
| 3,136,614 | A | 6/1964 | Kuzmick | |

(Continued)

FOREIGN PATENT DOCUMENTS

GB 2033558 A * 5/1980

*Primary Examiner* — Bret Hayes
(74) *Attorney, Agent, or Firm* — Cislo & Thomas, LLP

(57) ABSTRACT

A planar triangular patch for cleaning firearm bores. The patch has similarly sized notches placed centrally along the edges of the patch, permitting a uniform level of pleating as the patch is inserted into a firearm bore and wraps around a jag. The patch is made of a material design to clean and preserve the interior of a firearm bore and applies uniform pressure against the bore as it presents the face of its longest radius to the bore interior, cleaning the entire bore simultaneously.

12 Claims, 5 Drawing Sheets

U.S. PATENT DOCUMENTS

| | | | | |
|---|---|---|---|---|
| 3,205,518 | A | | 9/1965 | Romaine |
| 3,262,557 | A | | 7/1966 | Pucci |
| 3,377,643 | A | | 4/1968 | Teng et al. |
| 3,682,556 | A | | 8/1972 | Hanson |
| 3,739,420 | A | | 6/1973 | Kafkis |
| 3,745,589 | A | | 7/1973 | Borsing |
| 3,861,993 | A | | 1/1975 | Guthrie |
| D245,473 | S | | 8/1977 | Heninger |
| 4,050,175 | A | | 9/1977 | Mulinix |
| 4,175,493 | A | | 11/1979 | Daily |
| 4,328,632 | A | * | 5/1982 | Beers ................................ 42/95 |
| 4,344,278 | A | | 8/1982 | Jamison et al. |
| 4,399,627 | A | | 8/1983 | Malesky |
| 4,499,625 | A | | 2/1985 | Bottomley |
| 4,606,183 | A | | 8/1986 | Riggs |
| 4,702,028 | A | | 10/1987 | Dahlitz |
| 4,716,673 | A | | 1/1988 | Williams |
| 4,962,607 | A | | 10/1990 | Baldwin |
| 4,967,439 | A | | 11/1990 | LaLonde |
| 5,171,925 | A | | 12/1992 | Mekler |
| 5,337,505 | A | | 8/1994 | Brown et al. |
| 5,435,090 | A | | 7/1995 | Darrow |
| 5,450,795 | A | * | 9/1995 | Adelman ...................... 102/444 |
| 5,557,871 | A | | 9/1996 | LaLonde |
| 5,588,242 | A | | 12/1996 | Hughes |
| D384,507 | S | | 10/1997 | Mudie |
| 5,691,501 | A | * | 11/1997 | Gilbert .......................... 102/444 |
| 5,815,975 | A | | 10/1998 | Rambo et al. |
| 5,829,088 | A | | 11/1998 | Ujihara |
| 5,839,150 | A | * | 11/1998 | Miyaoka ...................... 15/209.1 |
| 5,920,940 | A | | 7/1999 | Kauska et al. |
| 5,983,550 | A | * | 11/1999 | Skaar ................................ 42/95 |
| 6,105,591 | A | | 8/2000 | DeCare |
| 7,030,306 | B1 | | 4/2006 | Chang |
| D566,285 | S | | 4/2008 | Park |
| 7,367,151 | B1 | | 5/2008 | Black et al. |
| D576,367 | S | | 9/2008 | Anderson |
| 2002/0056219 | A1 | | 5/2002 | Solberg et al. |
| 2006/0236584 | A1 | | 10/2006 | Williams |
| 2006/0242881 | A1 | | 11/2006 | Riebling |
| 2007/0266610 | A1 | | 11/2007 | Coffield, III |

* cited by examiner

FIREARM BARREL CLEANING PATCHES

This application claims the benefit of the filing date of provisional application No. 61/189,179, filed on Aug. 15, 2008.

BACKGROUND

The number of guns owned by civilians in the United States is estimated at about 250 million. These firearms have bores or barrel tubes through which projectiles travel. As firearms operate, carbon, lead or other materials gradually form accretions on the interior of the bore. Because of its elongated shape and small diameter, there is limited access, making the bore a particularly difficult area to clean. As accretions form on the bore interior, they interfere with projectiles travelling through the bore, affecting both velocity and accuracy.

Preserving accuracy and firearm performance requires regular bore maintenance including lubricating, polishing and cleaning to remove debris accumulations. Cleaning and debris removal must be done carefully, however, as damage to the rifling lands of the bore can permanently damage the firearm. A bore from which excessive material is removed increases the bore diameter, potentially leading to casing rupture.

One common cleaning method to avoid damage uses small pieces of cloth-like material or "patches" as they are called in the art. As a user draws a patch through the bore, friction between the patch and bore interior surface causes debris to adhere to the patch, which carries it away. For this reason, the structure and composition of patches are considerably important. A patch fitting too loosely inside a bore won't clean sufficiently. A patch fitting too tightly may become lodged in the bore and users may damage the bore interior attempting to dislodge the patch.

For optimum firearm performance, there is a need for a patch that will clean evenly, not favoring one area of the bore circumference while neglecting another, and for a patch that presents the greatest cleaning area along the length of the bore interior. Therefore it is an object of the present invention to provide a bore patch that evenly cleans the entire bore circumference, while providing the longest contact length along the bore. Another object is to provide patches that fold uniformly in the same configuration without assistance from a user. Another object of the invention is to provide a patch that creates sufficient pressure between a jag and firearm bore to clean accumulated debris from the bore without creating enough pressure to become stuck inside the bore. These and other objects will become apparent through the appended summary, description and claims.

SUMMARY

The present invention is a greatly improved gun bore cleaning patch typically used with a jag to remove residue and build up. The patch is substantially planar and triangular. Although various other three-sided polygons such as isosceles, right or scalene triangles can be used, an equilateral triangle is preferred since it presents the greatest uniform distance from the triangle center to the tips of the patch and promotes uniform pleating of the patch material as it enters a bore.

The patch has cut-outs or notches along its edges to provide room for extra material as the extreme ends fold and pleat in use. The notches are preferably located at the center along each edge of the patch. In various cases, they may be a variety of shapes and they may be off center. The shape and positioning of each notch corresponds to the shape of the patch in order to allow the proper amount of material layering.

When the patch is inserted into a bore, a uniform number of pleated layers is present. As more layers of patch occur, more friction occurs. With too many layers, the pressure between the jag and bore would cause the patch to stick inside the bore or dislodge from the jag. With insufficient layering, the patch would not dislodge debris in the bore.

In a manner similar to the notches, holes may be disposed in a patch. The size and positioning of holes, like the notches, depends on the size and shape of the patch since the holes serve the same space-saving function as notches, i.e., the holes are disposed symmetrically to cause even folding and pleating of the patch material.

Holes may also comprise slits or similarly restrictive shapes to accommodate a cable or rod affixed to the patch. Differing positions of the slits or holes causes different parts of a patch to be exposed to the bore wall.

The patch can be made of various materials. Animal, plant, metallic/mineral or synthetically derived materials are contemplated and may be woven, non-woven, napped, and knitted. Various properties may be imparted these materials to affect the patch absorbency, elasticity, flexibility and the degree of napping.

The patch may comprise material embedded in its fabric. Patches may be soaked with liquids for cleaning, chelating, lubricating, polishing and protecting the bore interior. Abrasives may be embedded into wet or dry patches to assist cleaning.

A backing material may be adhered to the surface of the patch imparting properties not found in the core patch material, such as rigidity, flexibility and elasticity. The backing may be made of paper, natural fabric, synthetic materials or mesh. In another preferred embodiment, the patch may comprise an agent for cleaning, polishing or lubricating.

To use the device, a patch is wrapped around a jag. Additionally, the patches may be slipped inside a slotted jag, or through a jag eyelet. Bore brushes may also be used. A patch is wrapped around a sub-caliber bore brush to which the patch adheres. Prior to use, a patch may be soaked or wetted with solvent to clean black powder or smokeless powder by-products, metal oxides, rust, other corrosion, or debris. Patches may also use preservatives and materials to preserve and protect the condition of the bore.

A patch is centered on a brush or jag and aligned with the barrel of a firearm. As the brush is pushed into the barrel, the patch folds over the jag and the edges of the patch begin to pleat. Once inside the bore, by reciprocating action, the patch scrubs away debris from the bore interior. In addition to cleaning, the patch may be wrapped around spherical shot or other projectiles and inserted into a bore to serve as wadding.

An advantage of the triangular shape of the patches is that they may be manufactured using a tessellated die to produce very little or no waste. To manufacture the patches, the material comprising the patches is assembled in multi-layered sheets. A die comprising the triangular pattern tessellated into a mosaic pattern so that adjacent triangles share common sides is used to cut through the material under pressure. Using this technique, only the material cut out to form notches or holes is wasted.

DESCRIPTION

Figure 1:
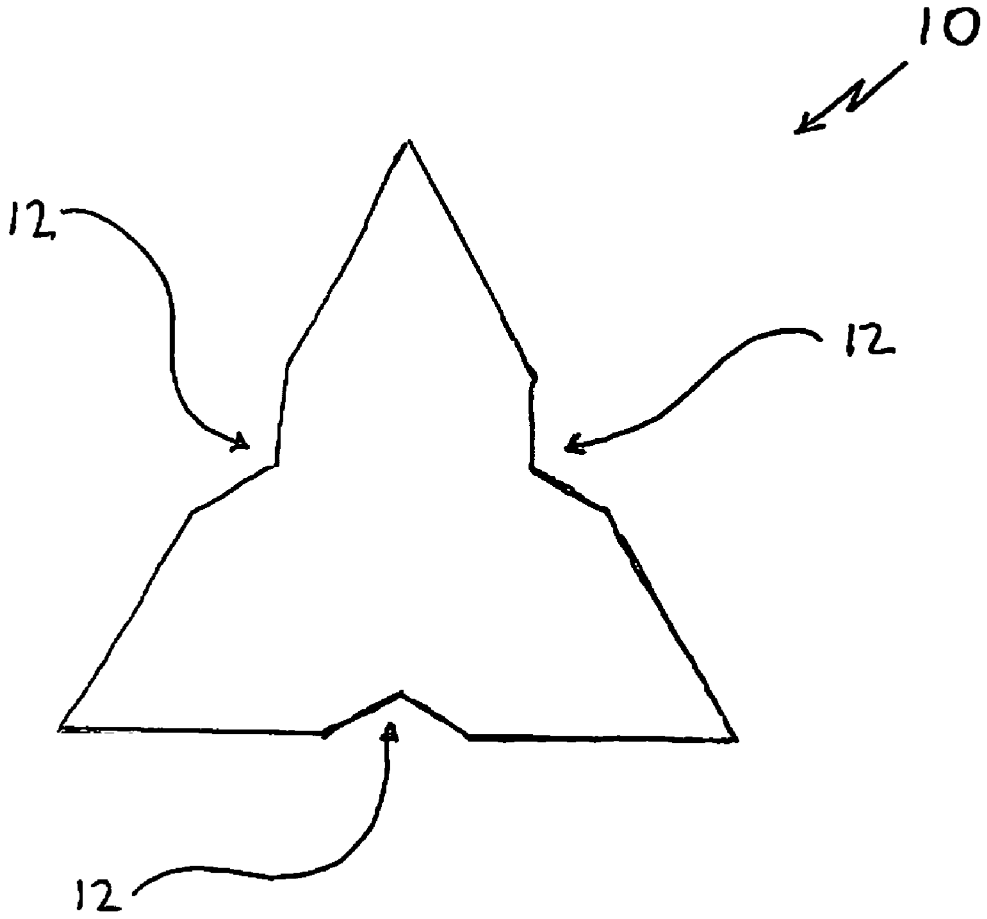
FIG. 1 is a top view of a triangular firearm cleaning patch.

The present invention comprises an improved firearm bore cleaning patch for use with a jag or other supporting device to remove residue that builds up by accretion through firearm use. Referring to FIG. 1, the patch 10 is a substantially planar piece of material in the shape of a triangle. Although various embodiments anticipate other three-sided polygons such as isosceles, right or scalene triangles, in the preferred embodiment, an equilateral triangle is used. Comparisons of the total areas of triangle shapes versus other shapes are illustrated in the following table:

Constraint: in any table, the total patch areas are equal. The areas are set equal to the area given by a standard square patch or by a standard round (circular) patch. Therefore, in each table, the dimensions start from the value of 2s or 2R.

Given: 2s

| Shape | Square | 2-by-1 rect | 4-by-1 rect | Triangle |
|---|---|---|---|---|
| Area Formula | $(2s)^2$ | $8 \cdot u^2$ | $16 \cdot t^2$ | $3\sqrt{3} \cdot a^2$ |

Constraint: $(2s)^2 = 8u^2 = 16t^2 = 3\sqrt{3}a^2$

Given: 2R

| Shape | Round | Triangle |
|---|---|---|
| Area Formula | $\pi \cdot R^2$ | $3\sqrt{3} \cdot a^2$ |

Constraint: $\pi R^2 = 3\sqrt{3}a^2$

Equilateral triangles are preferred, since they present the greatest uniform distance from the center to the tips of the triangle, and promote uniform pleating as the patch enters a bore. A comparison of triangle center to the apothem versus other shapes can be seen in the following tables:

The apothem of a patch is the length of segment OA shown in Diagram 8. Difference ratios below are percents when multiplied by 100. Constraint: assume areas are equal.
$(2 \cdot s)^2 = \pi \cdot R^2 = 8 \cdot u^2 = 16 \cdot t^2 = 3\sqrt{3} \cdot a^2$

| Shape | Square | Round | 2-by-1 rect | 4-by-1 rect | Triangle |
|---|---|---|---|---|---|
| Apothem | s | R | u | t | a |
| Apothem as a function of s | s | $\frac{2 \cdot s}{\sqrt{\pi}}$ | $\frac{s}{\sqrt{2}}$ | s/2 | $\frac{2 \cdot s}{3^{3/4}}$ |

Formulas for difference ratios are given as follows:

$$\text{“Triangle versus Other Shape”} = \frac{(\text{other shape apothem}) - (\text{triangle apothem})}{(\text{other shape apothem})}$$

$$\text{“Cross versus Other Shape”} = \frac{(\text{other shape apothem}) - (\text{cross apothem})}{(\text{other shape apothem})}$$

| Shapes | Difference Ratio: Exact | Difference Ratio: Approx. |
|---|---|---|
| Triangle versus Square | $1 - \frac{2}{3^{3/4}}$ | 0.123 |
| Triangle versus Round | $1 - \frac{\sqrt{\pi}}{3^{3/4}}$ | 0.222 |
| Triangle versus 2-by-1 rectangle | $1 - \frac{2\sqrt{2}}{3^{3/4}}$ | Neg 0.241 |
| Triangle versus 4-by-1 rectangle | $1 - \frac{4}{3^{3/4}}$ | Neg 0.755 |

| Shape | Square | Round | 2-by-1 rect | 4-by-1 rect | Triangle |
|---|---|---|---|---|---|
| Radius | $\sqrt{2} \cdot s$ | R | $2 \cdot u$ | $4 \cdot t$ | $2 \cdot a$ |
| Radius as a function of s | $\sqrt{2} \cdot s$ | $\frac{2 \cdot s}{\sqrt{\pi}}$ | $\sqrt{2} \cdot s$ | $2 \cdot s$ | $\frac{4 \cdot s}{3^{3/4}}$ |

| Shapes | Difference Ratio: Exact | Difference Ratio: Approx. |
|---|---|---|
| Triangle versus Square | $\frac{2^{3/2}}{3^{3/4}} - 1$ | 0.241 |
| Triangle versus Round | $\frac{2\sqrt{\pi}}{3^{3/4}} - 1$ | 0.555 |
| Triangle versus 2-by-1 rectangle | $\frac{2\sqrt{2}}{3^{3/4}} - 1$ | 0.241 |
| Triangle versus 4-by-1 rectangle | $\frac{2}{3^{3/4}} - 1$ | Neg 0.123 |

In other embodiments, triangles with rounded sides, corners and side protrusions may be used, such as a Reuleaux triangle. In yet more embodiments, non-triangular shapes may be used, including rectangles, parallelograms, crosses, and other polygonal and non-polygonal shapes.

Still referring to FIG. 1, the patch has notches 12 disposed along the edges of the patch to provide room for the extreme ends of the triangle as they fold and pleat when entering a firearm bore. In the preferred embodiment, the notches 12 are disposed at the center of each edge and comprise a simple triangular cut. In various other preferred embodiments, the notches may comprise a variety of shapes including trapezoidal, domed, tapered or compound shapes. In further embodiments, the notches may be disposed off center. The shape and positioning of the notches corresponds to the shape of the patch in order to allow the proper amount of layering through pleating action.

Figure 2:
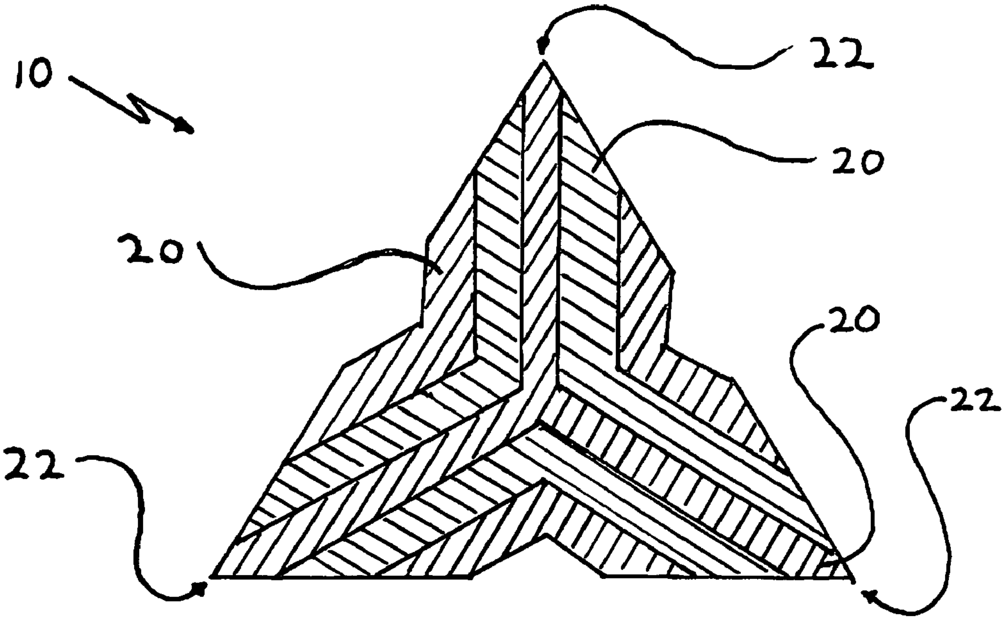
FIG. 2 is a top view of a triangular firearm cleaning patch showing the areas that fold and pleat as the patch enters a bore.

Referring to FIG. 2, the device 10 is shown with the areas of pleating 20 illustrated. The areas of pleating correspond to the extreme ends of the triangle 22, which is under the greatest tension as the patch 10 is used. Through this action, the area from the center of the triangle to each extreme end 22 contacts the bore interior and the folded pleating 20 creates pressure and contacts any other areas of the bore without contact. The differences between triangular pleating versus other shapes and the optimum number of pleats is shown in the following table, wherein dimensions are in inches, areas in square inches, and ratios are percents when multiplied by 100:

| | Caliber | | | | | |
|---|---|---|---|---|---|---|
| | 22 | 223 | 243 | 25 | 25 | 30 |
| | r | | | | | |
| | 0.107 | 0.109 | 0.118 | 0.125 | 0.125 | 0.145 |
| 2s | 1 | 1.25 | 1.25 | 1.25 | 1.75 | 2 |
| x/r | 3.1 | 3.8 | 3.6 | 3.4 | 4.7 | 4.6 |
| a/r | 4.1 | 5.03 | 4.6 | 4.4 | 6.1 | 6.1 |
| fourcircle 5-layer area | 0.2227 | 0.5579 | 0.4782 | 0.4188 | 1.46015 | 1.87328 |
| triangle 5-layer area | 0.072 | 0.2546 | 0.1963 | 0.1562 | 0.695531 | 0.896243 |
| triangle 7-layer area | 0 | 0.000059 | 0 | 0 | 0.105825 | 0.120657 |
| ratio fourcircle to triangle 5-layer | −2.09474 | −1.19164 | −1.43614 | −1.682 | −1.09934 | −1.09015 |

| | Caliber | | | | | |
|---|---|---|---|---|---|---|
| | 7.62 | 375 | 410 gauge | 40 | 45 | 45 |
| | r | | | | | |
| | 0.1495 | 0.185 | 0.193 | 0.2 | 0.225 | 0.225 |
| 2s | 1.75 | 2.25 | 2.25 | 2.25 | 2.25 | 2.5 |
| x/r | 3.9 | 4.1 | 3.9 | 3.8 | 3.4 | 3.7 |
| a/r | 5.1 | 5.3 | 5.1 | 4.9 | 4.4 | 4.9 |
| fourcircle 5-layer area | 1.13305 | 1.99309 | 1.86006 | 1.74598 | 1.35705 | 2.1059 |
| triangle 5-layer area | 0.527339 | 0.949966 | 0.86268 | 0.778446 | 0.505994 | 0.924161 |
| triangle 7-layer area | 0.002122 | 0.02001 | 0.002528 | 0 | 0 | 0 |
| ratio fourcircle to triangle 5-layer | −1.14861 | −1.09807 | −1.15614 | −1.24291 | −1.68195 | −1.27872 |

| | Caliber | | | | |
|---|---|---|---|---|---|
| | 50 | 50 | 20 gauge | 20 gauge | 12 gauge |
| | r | | | | |
| | 0.25 | 0.25 | 0.3 | 0.3 | 0.36 |
| 2s | 2 | 2.5 | 2.5 | 3 | 3 |
| x/r | 2.7 | 3.6 | 2.8 | 3.4 | 2.8 |
| a/r | 3.5 | 4.4 | 3.7 | 4.4 | 3.7 |
| fourcircle 5-layer area | 0.473854 | 1.67537 | 0.909231 | 2.41253 | 1.30929 |
| triangle 5-layer area | 0.084315 | 0.624684 | 0.201102 | 0.899545 | 0.289586 |
| triangle 7-layer area | 0 | 0 | 0 | 0 | 0 |
| ratio fourcircle to triangle 5-layer | −4.62004 | −1.68195 | −3.52124 | −1.68195 | −3.52125 |

Figure 3:
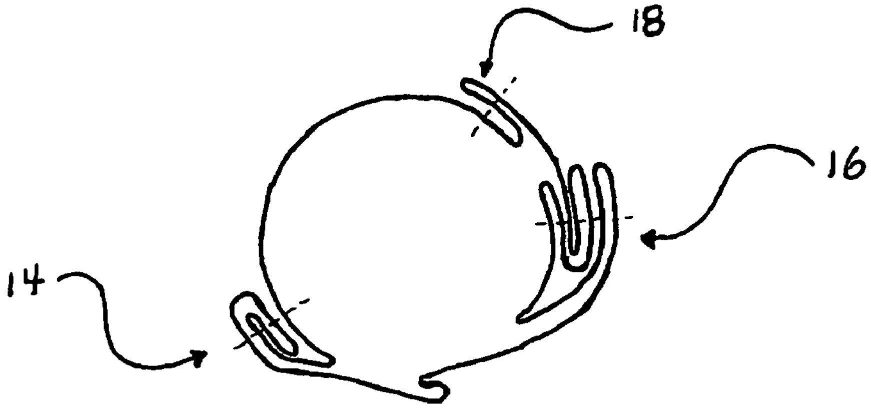
FIG. 3 is a cut-away view of a patch inserted into the bore of a firearm and exhibiting folding and pleating of the patch material.

Referring to FIG. 3, when the patch 10 is disposed in the bore, no more than five layers 14 of pleating should be present. As more layers accrue between a patch and the accretions inside the bore, more friction occurs. If too many layers 16 are present, the pressure between the jag and bore can cause the patch to dislodge from the jag and stick inside the bore. With insufficient layering 18, the patch generates insufficient friction to dislodge debris in the bore.

Figure 4:
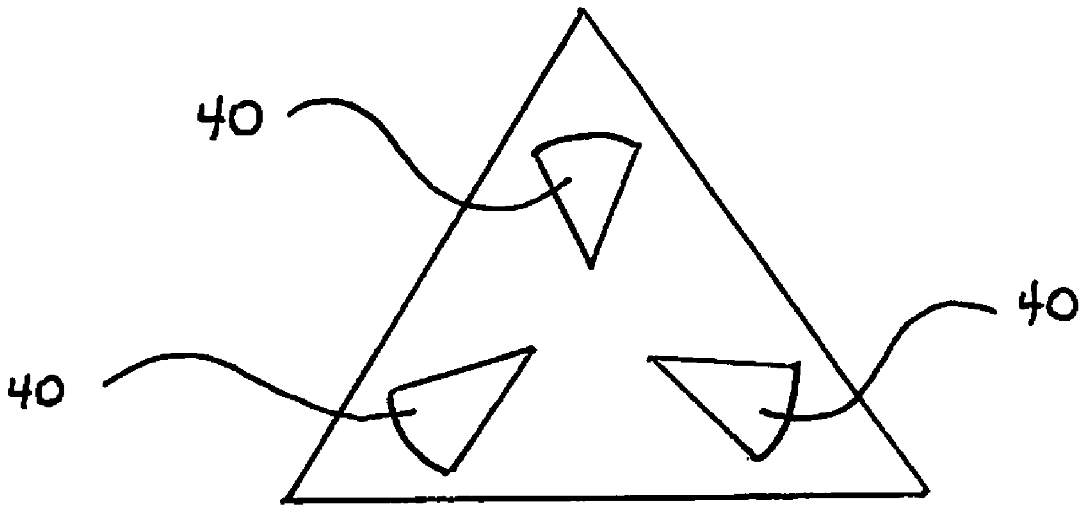
FIG. 4 is a top view of a triangular firearm cleaning patch with holes disposed in the surface.

Referring to FIG. 4, holes 40 may be disposed in the patch 10 in lieu of or in addition to the notches. The size and positioning of holes 40 depends on the size and shape of the patch 10 since the holes 40 serve the same space-saving function as the notches. In each embodiment, the holes are disposed symmetrically to cause even folding and pleating of the patch material.

In other embodiments, the holes may comprise slits or similarly restrictive holes to accommodate a cable or rod on which the patch is affixed. By positioning the slits or holes in different positions, different parts of a patch can be exposed to the wall of the bore.

Various materials may comprise the patch of the present invention. Materials used may be animal, plant, metallic/mineral or synthetically derived. Examples of plant based materials include cotton, wool, felt, and polish cloth. The construction of these materials may be woven, non-woven, napped, and knitted. Other materials include flexible solids, including foams. Various properties may be imparted to the patch using these materials. By combining materials from different sources, absorbency, elasticity, flexibility and the degree of napping can be affected.

In addition to specific combinations of materials, the patch may comprise additional materials embedded in its fabric. In one preferred embodiment, patches are soaked with liquids for cleaning, chelating, lubricating, polishing and protecting the bore interior. Other materials may include fibers embedded with resin or heat, including coated nylon fibers, metal, metal ribbons, wire mesh, and steel wool adhered through resins, weaving, knitting, slurry, heat, chemical reactions or electrical charge. Still other embedded materials may include abrasives such as emery sand, carbide mesh, silicon carbide, borazon, ceramic, ceramic balls, zirconiuym alumina, zirconia balls, novaculite, microcapsules, microfibers, nanorods, fullerenes, rouge, diamond dust, diamond paste, silica, glass beads, glass powder, pumice, diatoms, microshells from clay, metal oxides, cerium oxide, calcite, aluminum oxide, and metal mesh. These abrasives may be embedded into wet or dry patches.

In addition to abrasives, the patch may comprise a backing material on at least one surface. The backing material can impart properties to the patch not found in the core patch material, such as rigidity, flexibility, and elasticity. The backing may be made of paper, natural fabric, synthetic materials or mesh.

The structure of the improved bore cleaning patch having been shown and described, use of the device will now be described:

The patch is used in a manner similar to firearm bore cleaning patches currently known in the art. The patch is used in conjunction with a jag. The jag may be solid, ribbed, non-ribbed, smooth, rough, swiveling, and made of various types of standard material. Additionally, the patches may be slipped inside a slotted jag, or through a jag eyelet. Bore brushes may also be used. A patch is wrapped around a sub-caliber bore brush with bristles to which the patch adheres.

Prior to use, a patch may be soaked or wetted with solvent to clean black powder or smokeless powder by-products, metal oxides, rust, other corrosion, or debris. Patches may also be wetted with lubricants and other chemicals, natural and synthetic, to protect bores from rust and corrosion, or to assist in bore reconditioning. The patches can be used to apply solvents, lubricants, liquids, paste, foam, abrasives, microcapsules or other materials to the bore interior, and clean patches can be used to remove these materials. They may also be used with powered machinery for mechanized ultrasonic, gas, or liquid emersion cleaning systems and for polishing.

Figure 5:
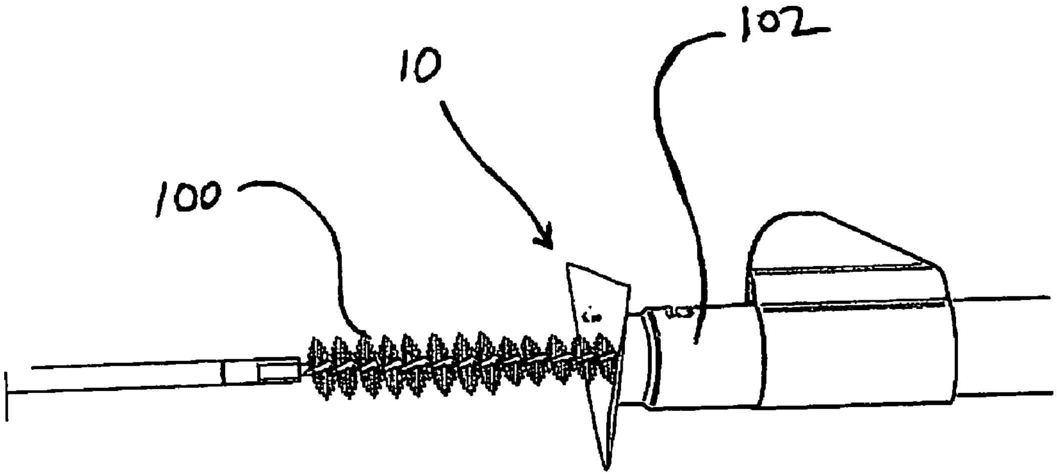
FIG. 5 is a side view of a patch disposed between a cleaning brush and the barrel of a firearm.
Figure 6:
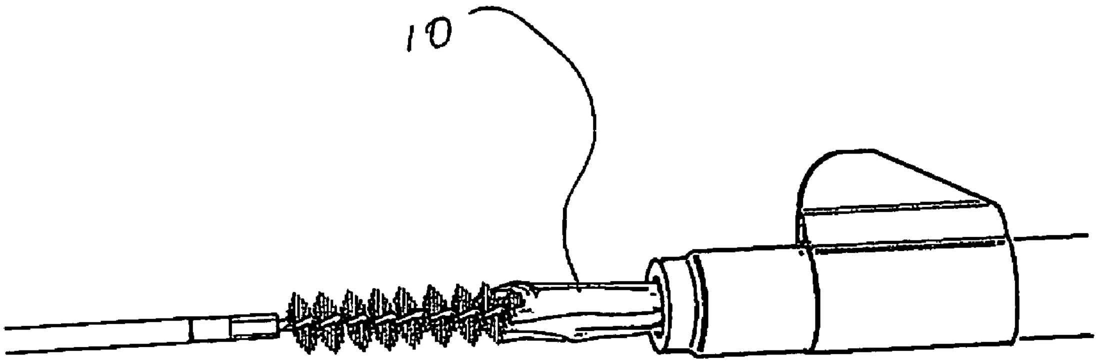
FIG. 6 is a side view of a patch disposed around a cleaning brush and exhibiting folding and pleating.

Referring to FIG. 5, the patch 10 is centered on a brush 100 or jag and aligned with the barrel of a firearm. As the brush 100 is pushed into the barrel 102, the patch 10 depends into the space between the brush 100 and barrel 102. As the patch deforms, the edges of the patch begin to pleat with the extreme ends of the triangle shape disposed against the bore. By reciprocating action, the patch scrubs away debris from the bore interior. A view of the patch 10 after it has been inserted into a bore is shown in FIG. 6. In addition to cleaning, the patch may be wrapped around spherical shot or other projectiles and inserted into a bore to serve as wadding.

The structure and use of the improved bore cleaning patch having been shown and described, manufacture of the device will now be described:

An advantage of the triangular shape of the patches is that they may be cut using a tessellated die to produce very little or no waste. To manufacture the patches, the material comprising the patches is assembled in multi-layered sheets. A die, comprising the triangular pattern tessellated into a mosaic pattern so that adjacent triangles share common sides is used to cut through the material under pressure. Using this technique, only the material cut out to form notches or holes is wasted.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved cleaning patch device for firearm bores comprising:

a. a planar patch in a shape of an isosceles triangle with a center, three sides, and three vertices where each side connects with another at one of each of the three vertices to form three extreme ends; and b. a notch formed along each side of the planar patch, c. wherein when the planar patch is inserted into a firearm bore using a jag, each extreme end depends over the jag causing excess patch material along each arm to fold and pleat in substantially the same pattern, and wherein each notch provides space to accommodate pleated patch material.

2. The device of claim 1 wherein at least one hole is disposed through the patch off from the center.

3. The device of claim 2, further comprising a plurality of openings selected from the group consisting of holes and slits, wherein the plurality of openings are evenly spaced apart from each other around the center of the planar patch.

4. The device of claim 1 wherein the patch comprises an abrasive.

5. The device of claim 1 wherein the patch is between 0.013 inches and 0.023 inches in thickness.

6. The device of claim 1 wherein steel wool is incorporated into the fabric.

7. The device of claim 1 wherein the patch comprises an added material incorporating an abrasive.

8. The device of claim 1 wherein the patch comprises a material incorporating a cleaning agent.

9. The device of claim 1 wherein the patch is moistened.

10. The device of claim 1 wherein the patch comprises a backing material.

11. The device of claim 1 wherein the patch is impregnated with structures chosen from the list of: microcapsules, microfibers, nanorods, and fullerenes.

12. An improved cleaning patch device for firearm bores comprising:

a. a planar patch in the shape of an isosceles triangle with a center and three extreme ends terminating at a sharp point, wherein a distance from the center to one of the three extreme ends defines a radius; and b. a notch formed along each side of the patch triangle, wherein a distance from the center to a point on the notch closest to the center defines an apothem, wherein a ratio of the radius to the apothem is greater than 2;

c. wherein when the patch is inserted into a firearm bore using a jag, each extreme end depends over the jag causing the excess patch material along each arm to fold and pleat in substantially the same pattern, wherein each notch provides space to accommodate pleated patch material, and wherein d. a surface portion of the patch extending from the patch center to each extreme end of the patch comes into direct contact with the bore.

* * * * *